United States Patent

Norris

[15] 3,636,536

[45] Jan. 18, 1972

[54] DERIVED CLOCK CIRCUIT IN A PHASE MODULATED DIGITAL DATA HANDLING SYSTEM

[72] Inventor: Kermit A. Norris, Azusa, Calif.

[73] Assignee: Leach Corporation, San Marino, Calif.

[22] Filed: Mar. 21, 1968

[21] Appl. No.: 715,098

[52] U.S. Cl. ....... 340/174.1 H, 340/174.1 A

[51] Int. Cl. ....... G11b 5/06

[58] Field of Search ....... 340/174.1 A, 174.1 G, 174.1 H

[56] References Cited

UNITED STATES PATENTS

| | | | |
|---|---|---|---|
| 3,217,329 | 11/1965 | Gabor | 340/174.1 |
| 3,323,115 | 5/1967 | Sims, Jr. | 340/174.1 |
| 3,496,557 | 2/1970 | Lowrance | 340/174.1 |
| 3,405,391 | 10/1968 | Halfhill et al. | 340/174.1 |

*Primary Examiner*—Bernard Konick
*Assistant Examiner*—Vincent P. Canney
*Attorney*—Jackson & Jones

[57] ABSTRACT

A method and apparatus for deriving a clock signal in a high-density digital data system wherein digital data levels are obtained directly from a coded signal recovered from a magnetic medium without any initial reliance on a clock signal. Such digital levels are obtained from the recovered coded signal by employing a decoder which utilizes differential phase shift techniques including a one-bit delay circuit. After such digital data levels have been derived, they serve as logic commands to gate out pulses representative of particular transitions of the coded signal recovered from the magnetic medium. The coded signal is applied to transition detectors yielding sharp spiked outputs for both positive and negative going transitions in the coded signal. The digital data levels logically pass and inhibit selected ones of the spiked pulses so that a continuous clock signal synchronized substantially at the midbit interval of existing digital data levels is generated. Both the digital data levels initially obtained without reliance on a clock signal, and a data-synchronized clock are available to utilization circuitry such as a computer.

29 Claims, 5 Drawing Figures

INVENTOR.
KERMIT A. NORRIS
BY Jackson & Jones
ATTORNEYS.

DERIVED CLOCK CIRCUIT IN A PHASE MODULATED DIGITAL DATA HANDLING SYSTEM

CROSS-REFERENCE TO RELATED APPLICATION

This application relates to a patent entitled "HIGH BIT DENSITY RECORD AND REPRODUCE SYSTEM" U.S. Pat. No. 3,518,648, issued June 30, 1970, by the same inventor and assigned to the same assignee as the present invention.

BACKGROUND OF THE INVENTION

In the above identified patent, a new and improved high bit density system is disclosed and claimed. In accordance with such a system, typical digital data wherein binary values are represented by discrete levels is converted into a phase modulated digital signal referred to as a split-phase mark (SϕM) signal. In the SϕM signal a binary ZERO includes a transition at the beginning and end of every bit period, and a binary ONE is represented by such beginning and end transitions. The ZERO and ONE selections, of course, are optional and may be reversed if desired plus an additional midbit transition. In the record channel, proper filtering and biasing allows the data-representing square-wave SϕM signal to be linearly recorded as a nonsaturated continuous analog signal on a magnetic medium. In the recovery channel, the recovered analog signal is filtered, hard limited and is compared with a one-bit delayed version of itself in an exclusive NOR circuit such that the data is restored to its original digital data levels without reliance on a clock or timing signal in the recovery channel. This system represents the first practical method, and first commercially acceptable apparatus which reliably and consistently handles packing densities of 10,000 bits per inch per track with an error rate of less than one error in over $10^8$ bits of information. Such a system thus represents a most significant advance in the state of magnetic data handling art.

In every data handling system, including the above-referenced system, various reactive components seriously phase distort certain frequency components of signals handled by the system. Such phase distortion is particularly prevalent in a magnetic recording and recovery system due to the nature of the components employed thereby. For example, the parameters which generally introduce phase distortion or phase shifts to certain frequency components of signals handled by the system include phase changes as a function of recorded signals through the thickness of the magnetic medium, phase variations in the filters, and phase variations introduced by reactive components in the amplifier and the record and reproduce heads to list some typical examples. Most such phase variations in a phase modulated signal of the system of my foregoing patent application are compensated for, to a large degree, by a signal synthesizer system which is described and claimed in a continuation-in-part application now U.S. Pat. No. 3,573,770, issued Apr. 6, 1971. Such phase distortion, as related to clock derivation, is discussed in more detail hereinafter.

DESCRIPTION OF THE PRIOR ART

Previous prior art systems for recovering data from a magnetic medium generally rely on a timing reference either recorded on the magnetic medium, or locally generated at the reproduce channel by a synchronized clock signal generator.

The approach of my invention is completely opposite to the approaches used in the prior art in that, generally speaking, in the prior art the clock signal must come first in order to serve as a reference for a subsequent data recovery operation. In my invention differential phase shift keying in the recovery channel restores the binary data directly to its original digital data format from a differentially phase shifted signal recovered from the magnetic medium without any reliance on a timing or clock reference. At a location in the recovery channel prior to final decoding of the recovered signal to its original digital data format, a substantially square-wave SϕM signal is reproduced. This reproduced SϕM signal and the restored digital data levels, once obtained, are logically combined in a logic circuit to provide a derived clock signal which is uniquely timed to a midbit cell data position in spite of phase variations necessarily introduced in the system.

One typical prior art approach is the employment of a so-called phase locked oscillator at the recovery location. Such a phase locked oscillator requires several bit periods to synchronize the oscillator output with the data locations. This prior art technique thus increases encoding and decoding costs, wastes data space, and interrupts continual data flow since it requires constant updating in order to stay phase locked with the data. Furthermore, such a phase-locked oscillator is susceptible to flutter which is always present in any magnetic recording and recovery system. An additional difficulty involved with a phase-locked oscillator stems from the known fact that such oscillators can vary only small amounts. At the extreme high bit rates of my invention, such a phase-locked oscillator cannot follow the data quickly enough to compensate for phase variations which are experienced. Accordingly, the output of a phase-locked oscillator would, most likely, drop completely out of synchronism with the data positions.

SUMMARY OF THE INVENTION

In accordance with my present invention, a SϕM signal which includes transitions at each bit cell boundary plus an additional midbit cell transition for ONES and no midbit cell transition for ZEROS is filtered and stored as a nonsaturating analog signal on a magnetic medium. In the recovery process, a substantially square wave SϕM signal is obtained by filtering and hard limiting a recovered analog signal from the magnetic medium. This SϕM signal is compared with a one bit delayed version of itself in an exclusive NOR circuit or a double balanced demodulator, so as to restore the SϕM signal to its original discrete digital data level format. The recovered digital data levels and a repeated and additionally delayed SϕM signal are applied to a derived clock logic circuit. The clock logic circuit includes first signal-emitting means for generating a train of spiked pulses synchronized with positive going transitions in the repeated SϕM signal and further includes a second signal-emitting means for generating a train of spiked signals coincident with negative going transitions in the repeated SϕM signal. The restored data levels serve as logic commands to control a gated output in accordance with the following rule of my invention. When the restored binary data is of one particular polarity, or level, (for example if the data is DOWN representing a ZERO) signals derived from both positive and negative transitions, are applied to an output terminal to serve as data-synchronized clock pulses. When the restored binary data changes to another level, (for example when the data goes UP representing a ONE) the signal emitted by the signal-emitting means coincident with the first transition to occur after the data changes levels is applied to the output as a clock pulse. Signals emitted from the other signal-emitting means, i.e., those transitions opposite from the first transition, are inhibited. Inasmuch as the data always goes UP or DOWN with a one-half bit period phase margin away from any possible transition to be derived from the SϕM signal, the clock logic has no difficulty in selecting the transition polarities which must be inhibited. Furthermore, any phase shifts that exist appear similarly in both data and the repeated SϕM signal. Accordingly, phase variations in the data, up to plus or minus one-half bit period may be compensated for by my derived clock invention without any fear of losing the clock signal even for high bit densities in the order of 10,000 bits per inch per track.

BRIEF DESCRIPTION OF THE DRAWING

The foregoing and other objects and features of this invention may more readily be appreciated when taken in conjunction with the description of the figures in which.

DESCRIPTION OF THE PREFERRED EMBODIMENT

Figure 1:
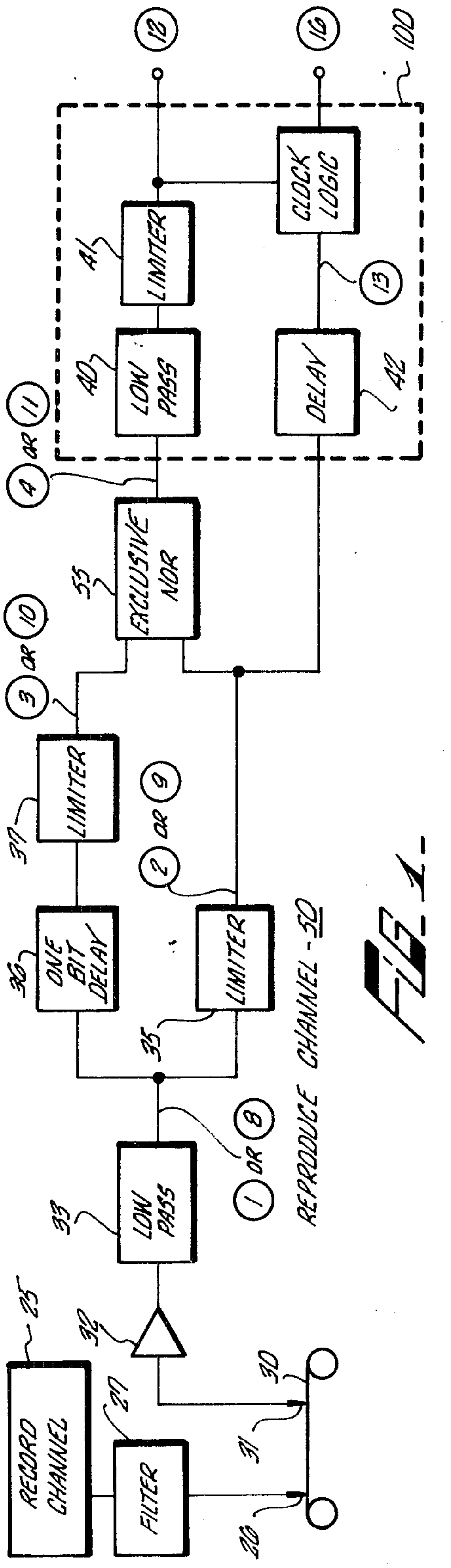
FIG. 1 is a block diagram of a high bit density record and reproduce channel in accordance with the principles of this invention.

Turning now to the drawings, the system of FIG. 1 depicts a record channel 25 and a reproduce channel 50 which includes a derived clock logic circuit 100. Record channel 25 and reproduce channel 50 are fully described in the aforementioned parent and continuation-in-part patents and a detailed operation of such channels may be obtained from such patents and need not be repeated in full here. Briefly, however, a magnetic surface 30 which may be any magnetic coating such as oxide coating used on storage members including tape, drums, disk files, or the like, is moved relative to the record head 26. Record channel 25 applies a filtered data-representing signal to a record head 26. Such signals are subsequently reproduced by movement of surface 30 relative to a signal reproduce head 31.

Figure 2:
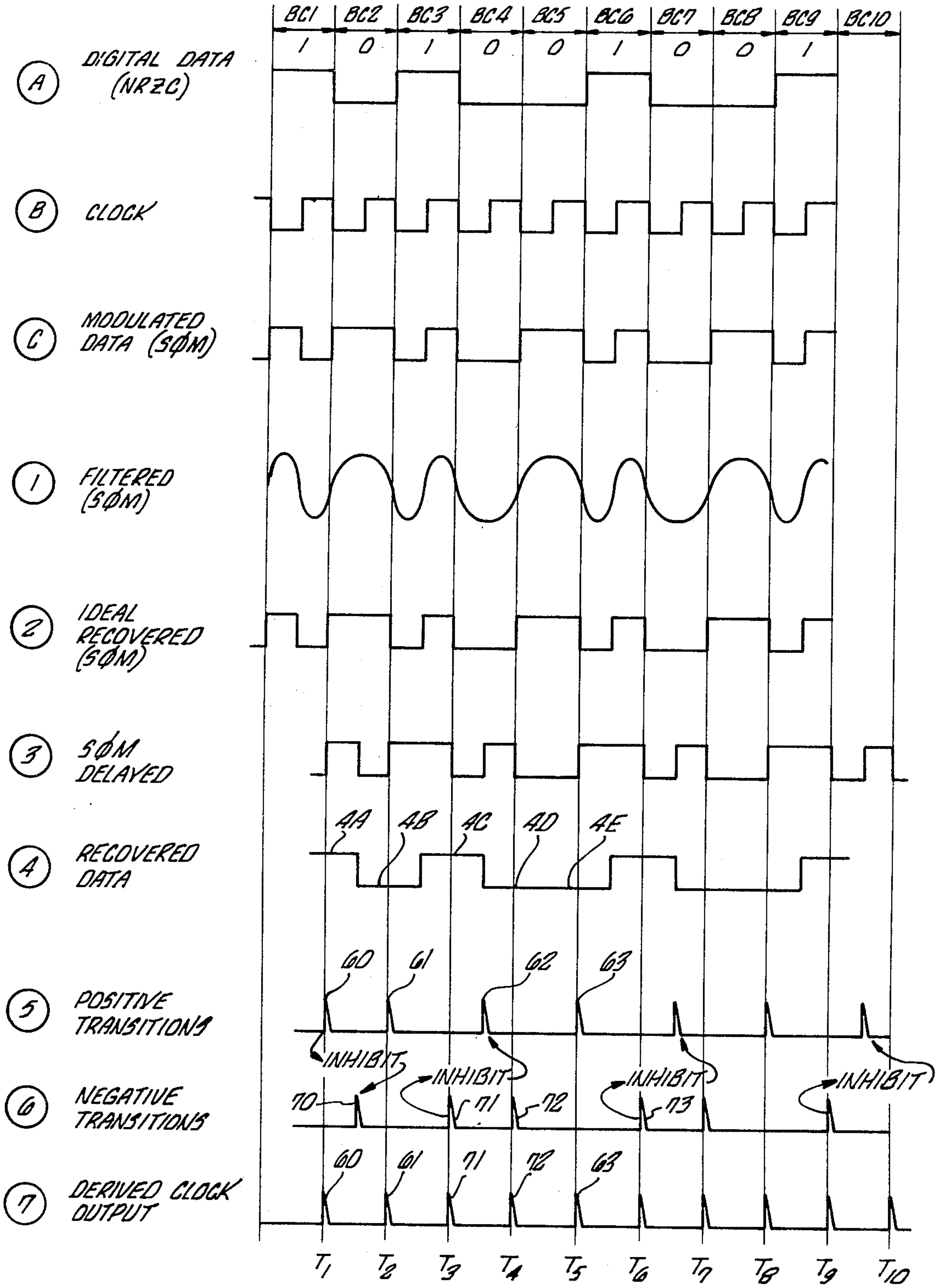
FIG. 2 is a chart of pulse and wave forms useful in promoting a clear understanding of the general concepts of the derived clock circuit of this invention.

Reference to rows A and B of FIG. 2 discloses one typical method for deriving a SϕM signal in the form of a binary level data-modulated clock signal for storage on magnetic medium 30. At Row A in FIG. 2, digital data is shown in a format wherein the digital values ONE and ZERO are represented by discrete levels extending for the duration of a bit cell period BC1, BC2, through BCN. This data, typically referred to as nonreturn-to-zero-change (NRZC) is modulated with a coherent square-wave clock signal shown at Row B of FIG. 2. A SϕM square-wave data train, shown at Row C of FIG. 2 is obtained as a result of the modulation, and this SϕM signal is passed through filter 27 and is recorded on the magnetic medium 30 as a nonsaturable analog waveform. This recording technique is fully described in the foregoing mentioned patents and reference may be had thereto if more details are necessary. It should be noted, however, that other recording processes may be employed in accordance with this invention.

In any event, however, it is assumed for purposes of description of the present invention, that a prerecorded SϕM signal has been recovered by head 31 and amplified by amplifier 32. The amplified signal is low-pass filtered by filter 33 which passes all frequencies equal to or below the incoming bit rate.

Figure 3:
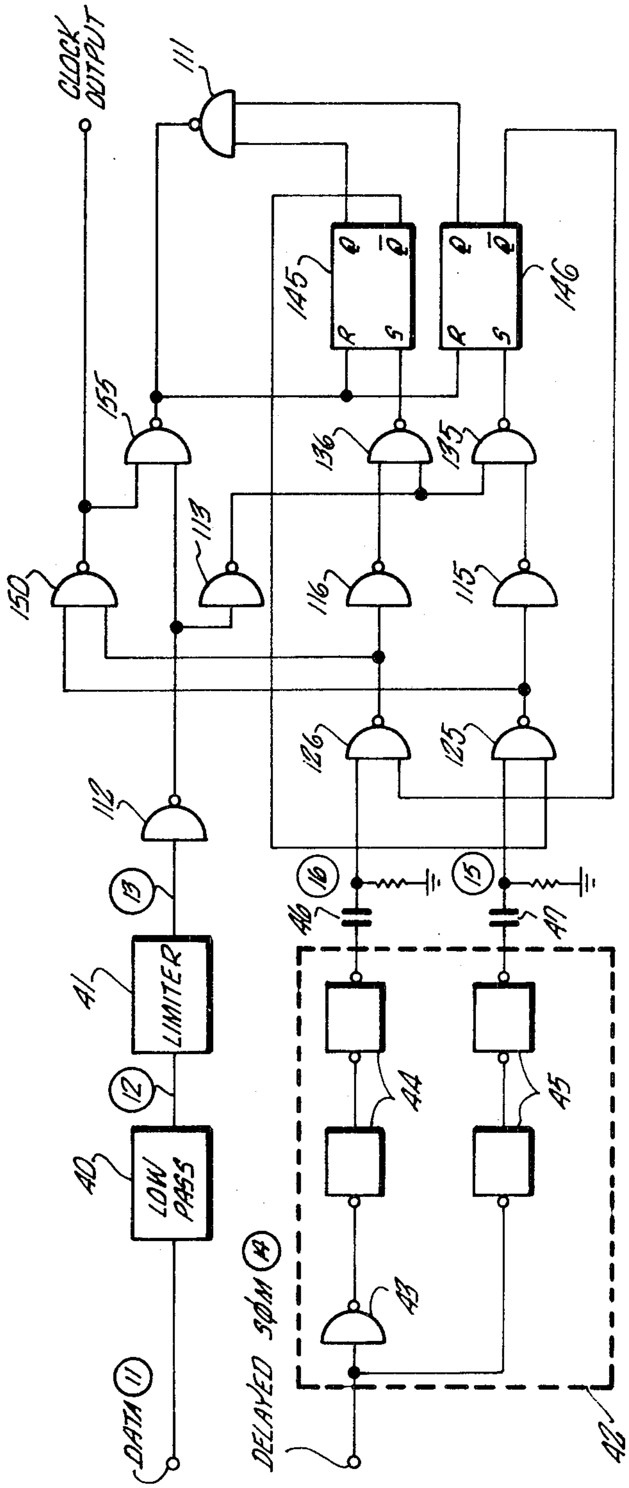
FIG. 3 is a combined block diagram and circuit schematic in more detail of a derived clock circuit in accordance with this invention.

The encircled numbers associated with the waveforms of FIG. 2 are identified as to circuit location in FIGS. 1 and 3. Thus, the above-mentioned filtered SϕM signal 1 is depicted at the output of low-pass filter 33. In one path for the filtered SϕM signal 1, a hard-limiter circuit 35 converts the filtered, or continuous analog SϕM signal 1, to a square-wave form shown at 2 in FIG. 2. In another path for the SϕM signal 1, a one-bit delay circuit 36 receives the filtered SϕM signal 1, and delays it one bit cell for application to another hard-limiter circuit 37. The output signals from both hard-limiter circuits 35 and 37 are applied to an exclusive NOR circuit, or double balanced demodulator 55, the operation of which is fully described in the foregoing mentioned patents. As described in said patent applications, the output of the exclusive NOR-circuit 55 is a recovered data train shown at Row 4 in FIG. 2.

In the description thus far, the waveforms have been described as idealized in that it was assumed that there is no phase shift present in the system. In practice, however, as will be described later, such idealized waveforms are difficult to obtain particularly at the high bit densities now available in accordance with my invention. Such idealized waveforms and particularly those of Rows 3 through 7 of FIG. 2 nevertheless are useful in demonstrating the broad principles and scope of my derived clock circuit and my method of deriving a data-synchronized clock signal.

The general method steps of deriving a clock signal output 7, FIG. 2, includes a comparison step between a square-wave SϕM signal in an exclusive NOR circuit with a one-bit cell delayed version of itself to restore ONES and ZEROS as levels extending for bit cell periods as shown in Row 4 of FIG. 2. Positive-going transitions (hereinafter positive transitions) in the delayed SϕM signal 3 are sensed by a leading edge detector and a train of corresponding spiked pulses 5 (one for each positive transition in the SϕM signal signal 3) are emitted. A trailing edge detector for the delayed SϕM signal 3, in a similar manner, emits a spiked output signal 6, including one pulse for each negative going transition of SϕM signal 3 (hereinafter negative transitions). The next method step is to sense the data levels of data signal 4. When the recovered data is sensed in a ONE or UP level, the first transition to occur thereafter (whether positive or negative) is applied to the clock output terminal as a clock output, and the next appearing transition is inhibited. On the other hand, when the recovered data is sensed as occupying a DOWN level representative of a binary ZERO, then upcoming positive and upcoming negative transitions are both gated to the clock output terminal.

The foregoing steps are clearly demonstrated by the legend employed between Rows 5 and 6 in FIG. 2. As there shown, at time $T_1$, the recovered data pulse 4A of Row 4 is UP, and accordingly, a positive going transition 60 of Row 5 is selected as the first clock output signal 60 shown in Row 7, FIG. 2. This positive transition 60, Row 5, inhibits the next appearing negative transition 70, Row 6 as is symbolically shown by the INHIBIT legend from pulse 60 to pulse 70. Thereafter at time $T_2$, the recovered data pulse 4B is DOWN and a positive transition 61 Row 5 is selected as a second clock output signal shown at Row 7. At time $T_3$, the data is UP at pulse 4C and the first appearing negative transition 71 is selected as a clock output signal. In addition pulse 71 inhibits the next positive transition pulse 62. At times $T_4$ and $T_5$ the data pulses 4D and 4E are DOWN and thus both a negative transition 72 and a positive transition 63 serve as clock outputs. The foregoing described rules continue to apply throughout the remainder of the bit cells of the recovered data pulses and thus a continuous derived clock output train as shown at Row 7 is emitted. Comparison of the clock pulses of Row 7 with the data locations of Row 4 shows that the derived clock output yields sharp spiked outputs precisely at midbit cell locations for the information level clocked thereby.

Figure 4:
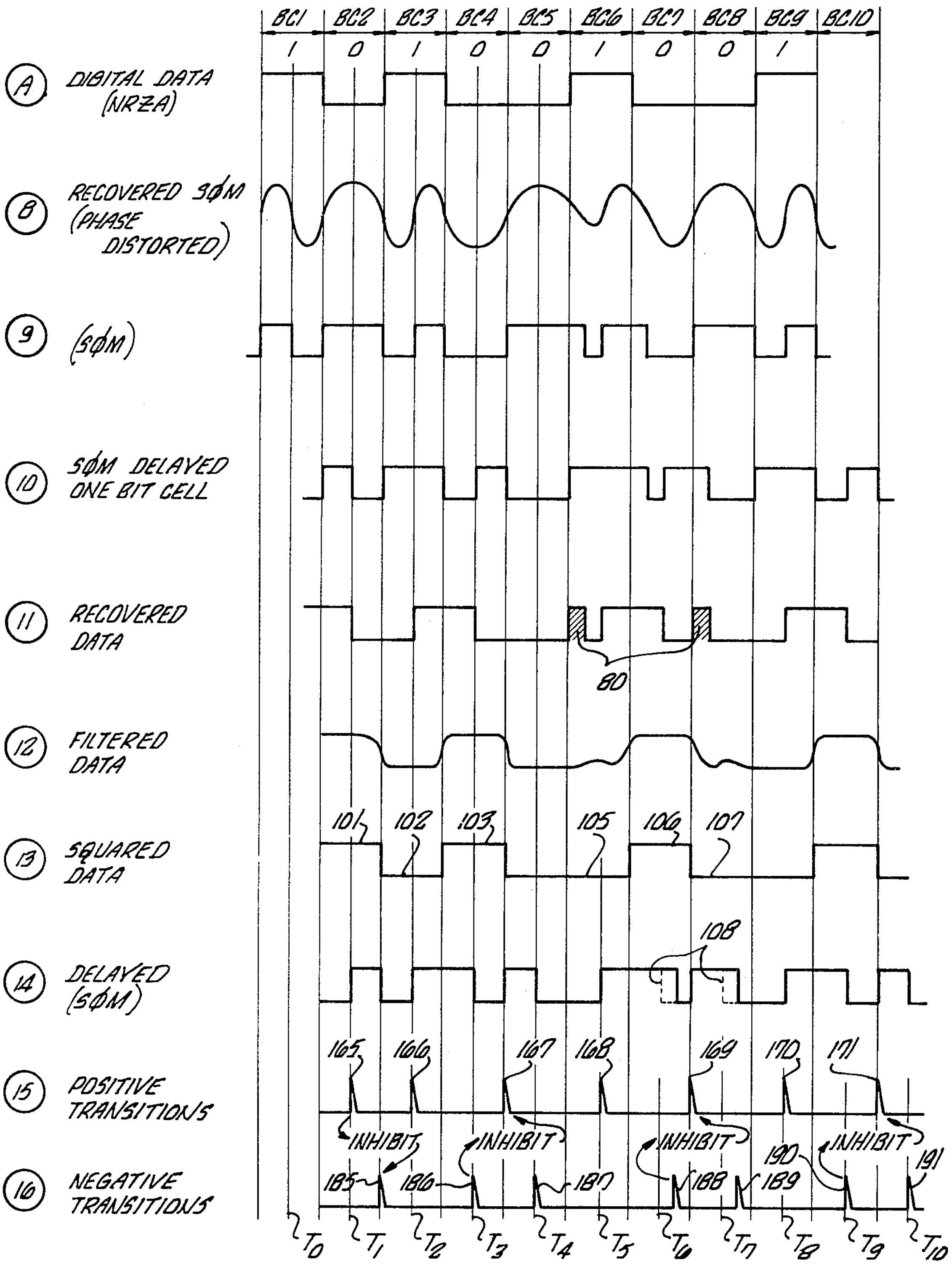
FIG. 4 is a chart of pulse and wave forms depicting phase distortion capable of being handled by the clock circuit of the present invention.

In the foregoing description it was assumed that the SϕM and the recovered data did not contain any phase distortion, which assumption, particularly at high bit densities, may not be valid. In FIG. 4 a phase distorted SϕM signal is depicted at Row 8. The SϕM signal after squaring by the limit circuits of the reproduce channel 50 of FIG. 1, may take the form shown at Row 9 in FIG. 4 wherein the data in bit cells BC5, BC6 and BC7 has been seriously phase distorted in view of the phase distortion problems mentioned hereinbefore. At Row 10 in FIG. 4 this SϕM has been delayed by one bit cell duration for its application to the exclusive NOR decoder circuit 55 of FIG. 1. The output wave form 11 of FIG. 4 depicts crosshatched noise signals 80 which are present in the exclusive NOR output and which result from the phase distortions in the SϕM signal. It is apparent that these noise signals 80 include frequency components of considerably higher frequency components than those making up the primary data representing signals. In FIG. 1 a low-pass filter 40 is connected to the output of the exclusive NOR-circuit 55 to remove high-frequency components which contribute to these noise pulses 80. A conventional limiter circuit 41 reshapes the filtered data at Row 12 in FIG. 4 to its squared data form Row 13, in FIG. 4.

It should be noted by reference to the timing waveforms of FIG. 4 that the additional low-pass filter 40 introduces an additional delay which may, in one representative embodiment, be a delay of one-half bit period relative to the recovered data wave form of Row 11 in FIG. 4. Inasmuch as the squared data and the SϕM signal must be phase synchronized, an additional delay 42 has been added to the derived clock circuit 100 of FIG. 1. The additional delay circuit 42 is selected to have a delay value sufficient to compensate for the additional delay introduced by the additional low-pass filter 40, or in this example a delay of one-half a bit cell. Delay circuit 42 may be any conventional type delay circuit, which merely for purposes of example, is repeated in FIG. 3 within dashed lines 42, and comprises two pairs of tandem connected multivibrators 44 and 45. The repeated SϕM signal 14 is applied directly to a multivibrator pair 45, and an inverted version of the SϕM signal 14, as inverted by an inverter or NAND-gate 43, is applied to a multivibrator pair 44.

Differentiator circuits 46 and 47 are connected to the output multivibrator of the multivibrator pairs 44 and 45 respectively. Differentiator circuit 47 provides a first train of spiked pulses shown in Row 15 FIG. 4, as representative of each positive going transition of the SϕM signal 14. The inverted SϕM signal 14 yields a second train of spiked pulses shown in Row 16 FIG. 4 as emitted by differentiator 46. The pulses of Row 16 are representative of negative going transitions of the SϕM signal 14. These positive and negative transitions of Rows 16 and 15 of FIG. 4 are applied by the differentiator circuits 46 and 47 to a pair of NAND-gates 125 and 126 respectively. Each of the NAND-gates 125 and 124 is adapted to be selectively inhibited such that none of the spiked pulses of Rows 15 and 16 will be passed and inverted thereby when gates 125 and 126 are inhibited. NAND-gate 125 or NAND-gate 126, provided that such gates are not inhibited by a low output level from flip-flops 145 and 146, respectively, will pass an inverted version of the spiked input signals. The signal levels presented at output terminals Q and $\overline{Q}$ from flip-flops 145 and 146 are shown at Rows 17 and 18 in FIG. 4A, which FIG. 4A it should be understood, is a continuation of the pulse and wave form timing chart of FiG. 4. The manner in which the flip-flop circuits 145 and 146 selectively inhibit or selectively pass certain of the positive and negative transitions 15 and 16 of FIG. 4 is described hereinafter.

Figure 4A:
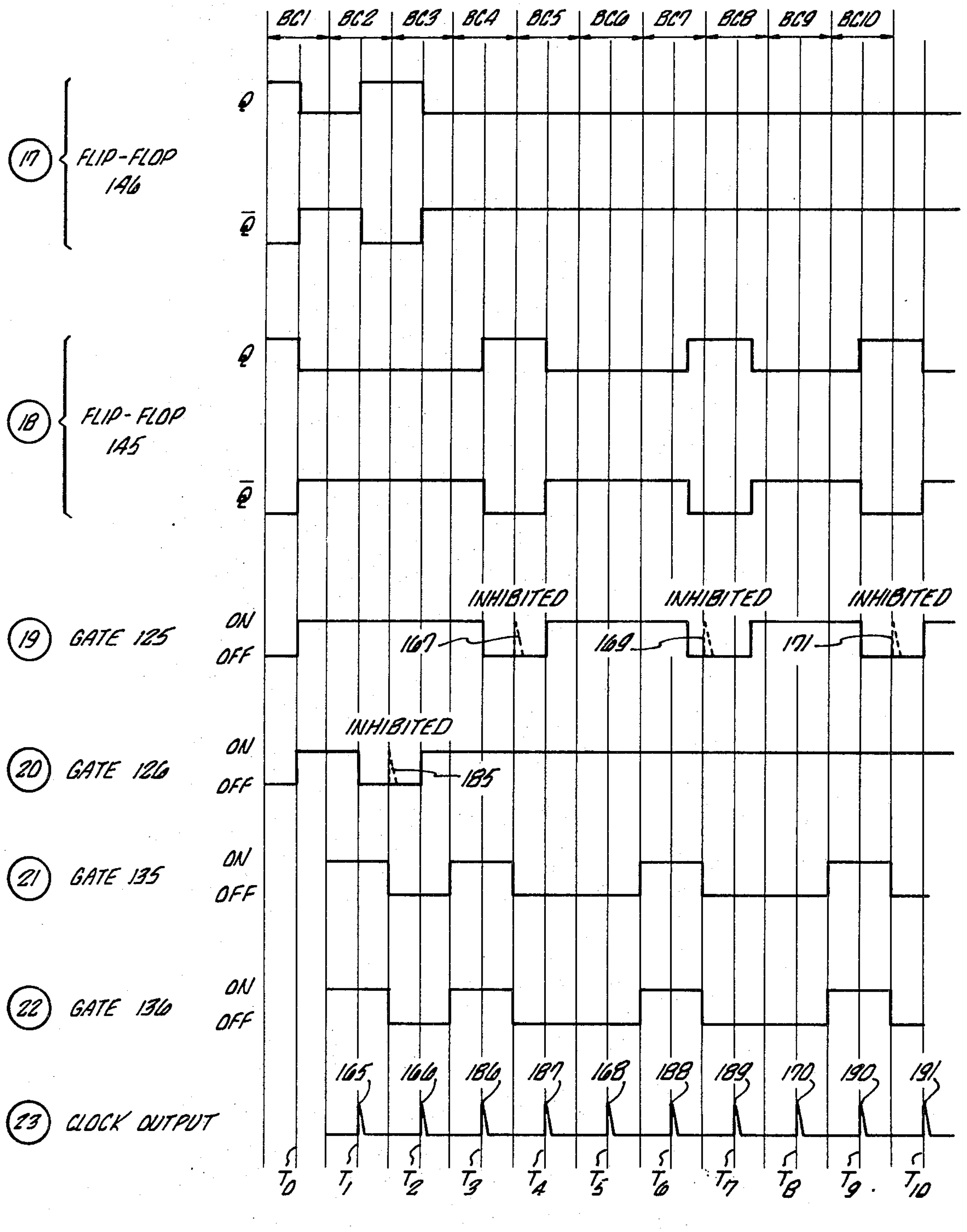
FIG. 4A is a continuation of the chart of FIG. 4.

In FIGS. 4 and 4A the time intervals $T_0$, $T_1$, through $T_{10}$ are shown at midbit times for each one of bit cell intervals BC1 through BC10. Just prior to time $T_0$ in FIG. 4A, assume that both flip-flops 145 and 146 are in a set condition which places the $\overline{Q}$ output terminal in its low condition as shown by Row 17 and 18 of FIG. 4A. A FALSE, or LOW polarity, on $\overline{Q}$ inhibits both NAND-gates 125 and 126. Such a condition, of course, would result in an inoperative arrangement and, accordingly, an initial condition NAND-gate 111 responds to coincidental HIGH Q output signals from both flip-flops 145 and 146 so as to apply a reset pulse at the reset leads R for both flip-flops 145 and 146. As shown in FIG. 4A, gate 111 accordingly establishes both flip-flops 145 and 146 in a reset condition at time $T_0$ wherein the $\overline{Q}$ output terminal for each is at a HIGH or TRUE level. This TRUE level at $\overline{Q}$ is applied to both gates 125 and 126 thereby enabling them to pass the first pulse to appear from either the positive or negative transitions of Row 15 or Row 16, FIG. 4. With this initial condition established, the clock circuit 100 of FIG. 3 is properly conditioned to receive data as typically shown by Row 11, FIG. 4.

Demodulator 55, FIG. 1, applies a decoded binary NRZC data train to a low-pass filter 40, FIG. 3. Connected to filter 40 is a limiter 41 which squares the data, Row 13, for application to a data command NAND-gate 112. A data pulse 101, Row 13, during bit cell BC2 is UP, or TRUE, and this condition is inverted by NAND-gate 112 and again is inverted by NAND-gate 113 so that it is presented as an UP level to both gates 135 and 126. This UP level for NAND-gates 135 and 136 will pass either a positive or a negative transition as a set pulse to flip-flops 145 or 146.

The first spiked pulse to appear after the initial condition is established is a positive transition pulse 165 which is coincident with an UP level from $\overline{Q}$ of flip-flop 145 or 146. Accordingly, the NAND gate truth table is satisfied and pulse 165 is gated through NAND-gate 125 which serves to invert pulse 165. The output from NAND-gate 125 is thereafter inverted again in gate 115 and thus, is of positive polarity coincident with the UP data level at gate 135. The inputs to gate 135 are satisfied and thus pulse 165 is passed and inverted by gate 135 for application as a set pulse for flip-flop 146. With flip-flop 146 set, the $\overline{Q}$ output is LOW thus acting, after time $T_1$, as an inhibit condition on NAND-gate 126. The next transition to appear (at the boundary between BC2 and BC3) is a negative transition pulse 185 which pulse 185 is blocked or inhibited. The OFF condition of gate 126 during the time $T_1$ through $T_2$ and the inhibited pulse 185 is shown at Row 20 of FIG. 4A.

Input signals for NAND-gate 150 are derived from the output of NAND-gates 125 and 126. Accordingly, when NAND-gate 125 passes the inverted pulse 165, it is, in turn passed and inverted by gate 150 as the first clock output pulse. The first clock output signal, pulse 165, appears at time $T_1$ as shown at Row 23, FIG. 4A. It should be noted that this clock output pulse 165 is at the midbit cell location for data pulse 101, Row 13, FIG. 4, and thus is a data-synchronized pulse.

It was mentioned hereinbefore that a logic rule of this derived clock invention states that when the data is UP, either positive or negative transitions can be gated through to the output terminal, and the gated-through transition inhibits the next transition to appear. Thus, as described above, either transition 165 or 185 could have been gated through to the clock output terminal, but since 165 appeared first and was gated out it, in turn, inhibits the next appearing transition 185.

The rule of this derived clock invention further states when the data drops DOWN the next transition to appear after the DOWN level is assumed is gated through as a clock output signal. It should be noted, Row 13, FIG. 4, that at the bit-cell boundary between BC2 and BC3, the data level drops DOWN to form a ZERO data pulse 102. This LOW data level of pulse 102 is inverted by NAND-gates 112 and 113 so as to inhibit both NAND-gates 135 and 136. The inhibiting action at NAND-gates 135 and 136, of course, has no effect on flip-flops 145 and 146 and, accordingly, they retain their respective states during the beginning of bit-cell BC3 as shown by Rows 17 and 18 of FIG. 4A, assuring inhibit of pulse 185.

At time $T_2$ the data pulse 102 is still DOWN representative of ZERO and the next positive transition which is pulse 166, Row 15, FIG. 4, is gated through NAND-gate 125 which gate is enabled as is shown by Row 19, FIG. 4A due to the state of flip-flop 145. This second positive transition pulse 166 is again gated through the output gate 150 as a second clock output signal 166 shown at Row 23, FIG. 4A.

The DOWN data level of pulse 102 is inverted by NAND-gate 112 and appears as a positive polarity pulse at the input of NAND-gate 155. At time $T_2$, pulse 166 at the output gate 150 is also applied to gate 155. Pulse 166 is inverted by NAND-gate 155 and serves as a reset pulse for both flip-flop 145 and flip-flop 146. Flip-flop 145 is already in a reset condition. However, flip-flop 146 was previously in a set condition so that pulse !166 serves to reset flip-flop 146. With both flip-flops 145 and 146 reset, both gates 125 and 126 are ON as shown by Rows 19 and 20 of FIG. 4A.

When both gates 125 and 126 are ON they allow, depending upon the next transition to occur, either positive or negative transitions to be gated through as output clock pulses. At time $T_3$ the next transition occurring is a negative transition 186. This negative transition 186 is passed by NAND-gate 126 on to the output gate 150 as a third clock signal. At the boundary of BC3 and BC4, it should be noted that the data pulse 103 went UP so as to allow pulse 186 to be gated through gate 136 and set flip-flop 145. After flip-flop 145 is set, the $\overline{Q}$ output terminal is LOW and NAND-gate 125 is inhibited so as to block passage of positive transition 167. Blocked transition 167 during bit period BC4 is shown at Row 19, FIG. 4A.

The foregoing described operation continues and as depicted in FIG. 4 and FIG. 4A, at time $T_4$ a negative transition pulse 187 is gated out as a clock output. Thereafter when the data pulse 105 is at a LOW level, pulse 168 is gated out of gate 150 as a next clock output pulse.

At the beginning of bit-cell BC7 the data pulse 106 is HIGH and pulse 188 is gated out at time $T_6$. It should be noted that NAND-gates !135 and 136 are held in an enabled condition during the entire bit-cell period BC7 as shown by Rows 21 and 22 of FIG. 4A. With these gates 135 and 136 in an ON condition, the negative transition pulse 188, even though it has been displaced due to the phase shifts, nevertheless occurs within the bit-cell interval with plenty of guard space so as to pass through the enabled NAND-gate 126. Pulse 188 appears, via gate 150, as a clock output signal 188. This pulse 188, via gates 116 and 136, also sets flip-flop 145. With flip-flop 145 set, the next positive transition 169 is inhibited at NAND-gate 125. It should again be noted that this inhibit action is assured even in spite of phase variations in the SφM signal of Row 14, FIG. 4.

During the bit-cell interval BC8, the data pulse 107 is DOWN and it blocks gates 135 and 136. With the gates 135 and 136 blocked the next pulse 189, at $T_7$, is gated out as a clock pulse via gate 150. Pulse 189 which is also applied to gate 155 sets both flip-flops 145 and 146. Thereafter, the operation continues in accordance with the foregoing described techniques.

It will be clear from the foregoing discussions that the derived clock circuit of this invention produces a continuous train of data-sychronized pulses even in the presence of severe phase distortion which phase distortion, prior to the advent of this invention, could not adequately be compensated for by any known prior art circuit.

Although described in FIG. 4 and FIG. 4A with reference to a one-quarter bit-cell phase variation as shown by dashed lines 108 in Row 14, FIG. 4, it should be appreciated that phase variations of ± one-half bit-cell duration are compensated for by this invention. This ± one-half bit-cell margin for phase errors is available due to the very nature of the timing relationship between the squared data of Row 13, FIG. 4 and the transitions obtained from the delayed SφM signal of Row 14, FIG. 4.

For example any phase variation in the SφM signal also appears as a phase variation in the data signal derived from that SφM, and this relationship holds for positive or negative phase variations. Thus, by repeating the SφM signal from which the data is derived, and placing it in proper timing sequence with the data, it is apparent that the data always goes DOWN or UP one-half bit interval away from either polarity transition; and thus, a one-half bit-cell margin exists for the derived clock system of this invention.

It is to be understood that the foregoing features and principles of this invention are merely descriptive, and that many departures and variations thereof are possible by those skilled in the art, without departing from the spirit and scope of this invention.

What is claimed is:

1. A clock generator for a data handling system in which data bits have assigned bit-cell boundaries, said system comprising:

means for emitting a continuous signal in which each bit of a first bit type is represented by a signal transition at each bit cell boundary, and each bit of a second bit type signal is represented by a signal transition at each bit-cell boundary plus a midcell signal transition;

decoding means connected to said continuous signal emitting means and operative free of any clock signal for restoring said signal transitions; and clock signal generating means connected to said continuous signal emitting means and gated by the bits restored by said decoding means for outputting clock pulses derived from selected ones of said signal transitions in synchronism with substantially the midcell locations of each of said restored bits.

2. A clock generator for a digital data system in accordance with claim 1 wherein said system includes distortion-producing components which tend to randomly shift said transitions from their assigned bit-cell locations, and wherein said decoding means comprises:

means for delaying said transitions by a bit-cell duration or a multiple thereof;

comparison means for comparing said nondelayed transitions with a delayed version thereof for restoring said bit types at distortion-shifted locations; and wherein said clock signal generating mans comprises means for deriving said clock pulses emitted thereby from said distortion-shifted transitions whereby compensation is afforded for said random shifts.

3. A clock generator for a digital data system in accordance with claim 2 wherein said deriving means comprises:

first deriving means for emitting a first series of pulses derived from first direction transitions in said continuous signal; and second deriving means for emitting a second series of pulses derived from second direction transitions in said continuous signal.

4. A clock generator for a digital data system in accordance with claim 3 wherein said clock signal generating means comprises:

first logic means gated by restored bits of said second bit type for outputting clock pulses derived by either said first or said second deriving means; and second logic means gated by restored bits of said first bit type, including gating signal applying means connected to said first logic means for outputting clock pulses derived only from the deriving means first operative after a restored bit changes from said second bit type to said first bit type.

5. A clock generator for a digital data system in accordance with claim 4 wherein said clock-generating means further comprises:

inhibiting means associated with said first and second logic means and operative in response to a clock output signal gated through said first logic means in response to one of said first or second deriving means to block any clock outputting in response to an upcoming pulse derived by the other of said deriving means.

6. A clock generator for a digital data system in accordance with claim 5 wherein said first logic means comprises:

a first and a second logic gate individually connected respectively to said first and said second driving means;

bistable means connected to said first logic means and set in a state normally enabling said first and second logic gates and selectively changeable to a state for inhibiting one of said first and second logic gates; and said inhibiting means comprises means for applying an output pulse from one of said first and second logic gates to said bistable means to alter the state thereof for inhibiting the other of said first and second logic gates.

7. A clock generator for a digital data system in accordance with claim 6 wherein said bistable mans comprises:

a first bistable device connected by first connecting means to an output of said first logic gate, said first bistable device adapted to apply its state as an input signal to said second logic gate; and a second bistable device connected by second connecting means to an output of said second logic gate, said second bistable device adapted to apply its state as an input signal to said first logic gate.

8. A clock generator for a digital data system in accordance with claim 7 and further comprising:

sensing means connected to receive said restored bits and further connected to said first and second bistable devices and including conditioning means responsive to restored bits of said second bit type for conditioning both of said bistable devices to be selectively set in a state for inhibiting one of said first and said second logic gates, by a pulse gated from one of said first and second deriving means.

9. A clock generator for a digital data system in accordance with claim 8 wherein said conditioning means comprises:

a pair of two-input logic gates with output terminals of one each connected to a set terminal of one each of said first and second bistable devices, and one input from each of said gates of said pair connected to an output terminal of one each of said first and second logic gates to pass pulses from either one of said first or second logic gates as set pulses for said bistable devices; and means for applying said level representative of said second bit type to the other input of said logic gate pair in proper polarity to pass a set pulse to the bistable device connected thereto, whereby the one of said logic gates that did not pass said set pulse is inhibited after passage of said pulse.

10. A clock generator for a digital data system in accordance with claim 7 and further comprising:

an initial condition-monitoring means connected to said first and second bistable devices and responsive to coincident-inhibiting states thereof for altering both bistable devices to enabling states therefor.

11. A clock generator for a digital data system in accordance with claim 10 wherein said monitoring means comprises:

a logic gate responsive to said coincident-inhibiting states for applying a reset signal to a reset terminal for each one of said bistable devices.

12. A clock generator for a data-handling system in accordance with claim 1 and further comprising:

an input terminal for receiving, from a source of data, bits having a first data-representing level for said first bit type and another data-representing level for said second bit type;

a magnetic medium;

bit formatting means for emitting a continuous analog signal in which each bit of a first bit type is represented by a signal transition at each bit-cell boundary and each bit of a second bit type is represented by a signal transition at each bit-cell boundary plus an additional midcell signal transition;

means coupled between said bit-formatting means and said magnetic medium for applying said analog signal thereto at a signal amplitude less than a saturation amplitude for said magnetic medium; and wherein said continuous signal-emitting means is coupled with said magnetic medium for reproducing said analog signal therefrom.

13. A clock generator for a data-handling system in accordance with claim 1 wherein:

said signal transitions at said bit cell boundaries and at said midcell location alter between positive and negative going directions depending upon the sequence of bits represented thereby; and wherein said clock signal generating means comprises:

selecting means for outputting clock pulses in synchronism with substantially the midcell location of each of said restored bits in a variable bit pattern in response to either direction signal transitions associated with individual bits of said pattern.

14. A clock generator for a data system in accordance with claim 13 wherein:

said signal transitions at said bit-cell boundaries occur a predetermined amount out of phase with said restored bits represented thereby; and said selecting means includes:

means responsive to a first bit type for selecting a signal transition at midcell time thereof and inhibiting the next following signal transition after said selected transition.

15. A clock generator for a data system in accordance with claim 14 wherein:

said signal transitions are about one-half a bit cell out of phase with said restored bits represented thereby.

16. A clock generator for a data system in accordance with claim 15 wherein:

said one-half bit-cell amount is subsequent in time to the restored bit represented thereby.

17. A clock generator for a digital system in accordance with claim 13 wherein said selecting means comprises:

a first and a second logic gate individually connected respectively to said first and said second deriving means;

bistable means connected to said first logic means and set in a state normally enabling said first and second logic gates and selectively changeable to a state for inhibiting one of said first and second logic gates; and further comprising:

inhibiting means for applying an output pulse from one of said first and second logic gates to said bistable means to alter the state thereof for inhibition the other of said first and second logic gates.

18. A clock generator for a digital system in accordance with claim 17 and further comprising:

a third logic gate responsive to an output clock pulse passed by a noninhibited one of said first and second logic gates and to a coincidental change in said bit types from a second to a first bit type for returning said bistable means to said enabling state.

19. A clock generator for a data-handling system in accordance with claim 2 wherein said phase shifts introduce noise spikes representing frequency components higher than the frequency components of said decoded data levels from said decoding means, and further comprising:

a noise filter connected to said decoding means for passing said frequency components of said decoded data and filtering out the frequency components of said noise spikes, said noise filter introducing an additional delay to said decoded data, and a additional delay mans in said clock signal generating means having a delay amount equal to said noise filter delay for delaying all of said signal transitions by said additional delay amount.

20. A clock generator for a data-handling system in accordance with claim 19 wherein said decoding means comprises:

a limit circuit means connected to said noise filter for shaping said output to a substantially square-wave signal, and means applying an output form said limit circuit as the gating signal for the clock signal generating mans.

21. A magnetic data handling system comprising:

means for storing data-representing levels on a magnetic medium in a coded form represented as a nonsaturating analog signal for said medium in which one data level includes signal transitions at its assigned bit-cell boundaries together with an additional midbit transition, and representing another data level as signal transitions at its assigned bit-cell boundaries only;

means for recovering said coded signal from said medium;

decoding means adapted to receive said recovered signal for restoring said original data levels from said data-representing signal transitions; and a derived clock circuit for said system, said clock circuit comprising:

signal-emitting means also adapted to receive said recovered signal and emit a signal for each signal transition thereof; and comparison means coupled to receive said decoded data levels and signals emitted from said emitting means in response to said signal transitions, said comparison means being responsive for selectively emitting clock pulses derived from selected ones of said signal transitions in synchronism with substantially the midbit cell location of said decoded data levels.

22. A data transmission system storing and recovering data-representing bits having assigned bit-cell boundaries on a magnetic medium, said system comprising:

means for representing data bits of a first type of two different data bit types as signal transitions at the bit-cell boundaries assigned to each data bit of said first type, and for representing data bits of a second type as signal transitions at the bit-cell boundaries plus an additional midcell signal transition for each data bit of said second type;

means for storing said transitions on said medium as a continuous analog signal having an amplitude less than a saturation amplitude for the medium;

decoding means coupled to recover said analog signal from the medium and operative for restoring said data bits to their original types from the transitions recovered from said medium;

signal-emitting means associated with said decoding means for emitting an output pulse for each one of said signal transitions; and logic mean receiving said signals emitted by said emitting means and gated by said decoded data bits for passing a clock output signal derived from selected one of said emitted signals in synchronism with substantially the midcell location of said decoded bits.

23. A clock generator for a digital data system comprising:

means for representing digital data levels in a split-phase-mark format;

means for emitting a first series of pulses derived from a first direction transition in said split-phase-mark format;

means for emitting a second series of pulses derived from a second direction transition in said split-phase-mark format;

decoding means operative free of a clock signal for restoring said split-phase-mark format to nonreturn-to-zero data levels; and logic means responsive to said nonreturn-to-zero data levels for selecting pulses from said first and second pulse series in synchronism with the midbit location of each one of said data levels, and for inhibiting nonselected pulses from said first and second pulse series.

24. A method of deriving a clock signal for a data-handling system, said method comprising:

emitting a continuous square wave signal in which each bit of a first bit type is represented by a signal transition at each bit-cell boundary, and each bit of a second bit type signal is represented by a signal transition at each bit-cell boundary plus a midcell signal transition;

decoding the output of said emitted signal free of any clock signal;

restoring said signal transitions in said continuous signal to said bit types represented thereby; and gating by the bits restored by said decoding means selected ones of said signal transitions in synchronism with substantially the midcell locations of each of said restored bits.

25. A method of serving a clock signal for a data-handling system in accordance with claim 24 wherein said gating step further comprises:

selecting a bit-cell boundary transition that is representative of and is aligned with a midcell time for a restored bit of a first bit type and inhibiting each midcell transition that is representative of each bit of said second bit type.

26. A method of deriving a clock signal for a data-handling system in accordance with claim 25 wherein said gating step further comprises:

selecting each bit-cell boundary transition representative of both of said bit-cell types as aligned with midcell times for restored bits of both bit types.

27. A digital data system comprising:

means for emitting a sequence of digital data bits in a split-phase-mark signal format;

decoding means receiving said sequence and emitting non-return-to-zero data levels indicative of said data bits and delayed by one-half a bit cell relative to corresponding bits of said split-phase-mark signal format; and clock-emitting means gated by the output signal of said decoding means for emitting clock signals only for those transitions of said split-phase-mark signal formats that are aligned in time at substantially the midpoint of said non-return-to-zero data levels.

28. A method for handling digital data and clock signals comprising the steps of:

representing a sequence of digital data bits in a split-phase-mark signal format;

decoding the split-phase-mark signal format to a nonreturn-to-zero data level indicative of the data bits contained therein;

delaying decoded data levels by one-half a bit cell relative to corresponding bits of said split-phase-mark signal format; and generating a clock signal derived only from those transitions of the split-phase-mark signal format which are aligned in time at substantially the midcell location of the decoded data.

29. A clock generator for a data-handling system in which data bits have assigned bit-cell boundaries, said system comprising:

means for emitting a continuous signal in which each bit of a first type is represented by a signal transition at each bit-cell boundary, and each bit of a second bit type is represented by a signal transition at each bit-cell boundary plus a midcell signal transition, said transitions traversing positive to negative directions in a random fashion dependent upon the sequence of data bits represented thereby;

decoding means connected to receive said continuous signal for restoring said signal transitions as levels extending for a bit period with the restored signal delayed by one-half a bit-cell interval in time relative to said bit types represented thereby in said continuous signal; and clock signal generating means connected to said continuous signal-emitting means and gated by the bits restored by said decoding means for outputting clock pulses derived only from selected ones of said signal transitions in synchronism with substantially the midcell locations of each of said restored bits.

* * * * *